Oct. 15, 1957   C. G. MUNTERS   2,809,817
APPARATUS FOR EFFECTING PHYSICAL INTERACTION BETWEEN
A GASEOUS AND A LIQUID MEDIUM
Filed July 12, 1954   5 Sheets-Sheet 1

INVENTOR
Carl Georg Munters
BY
Jarvis C Marble
his ATTORNEY

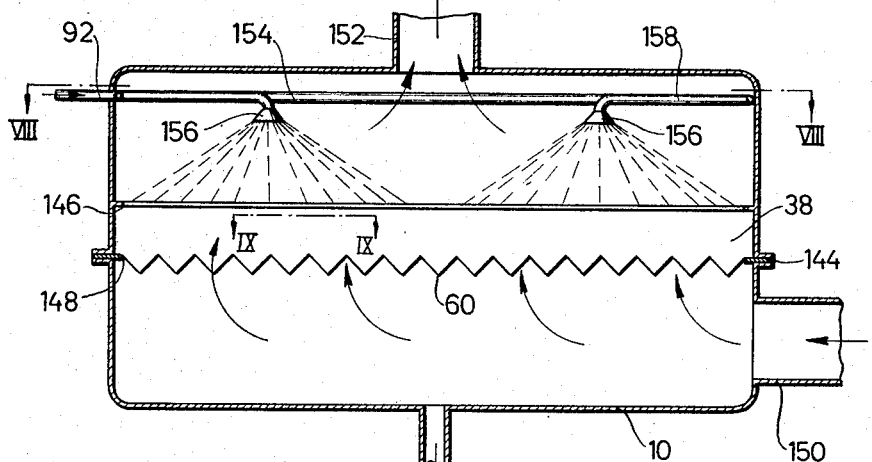
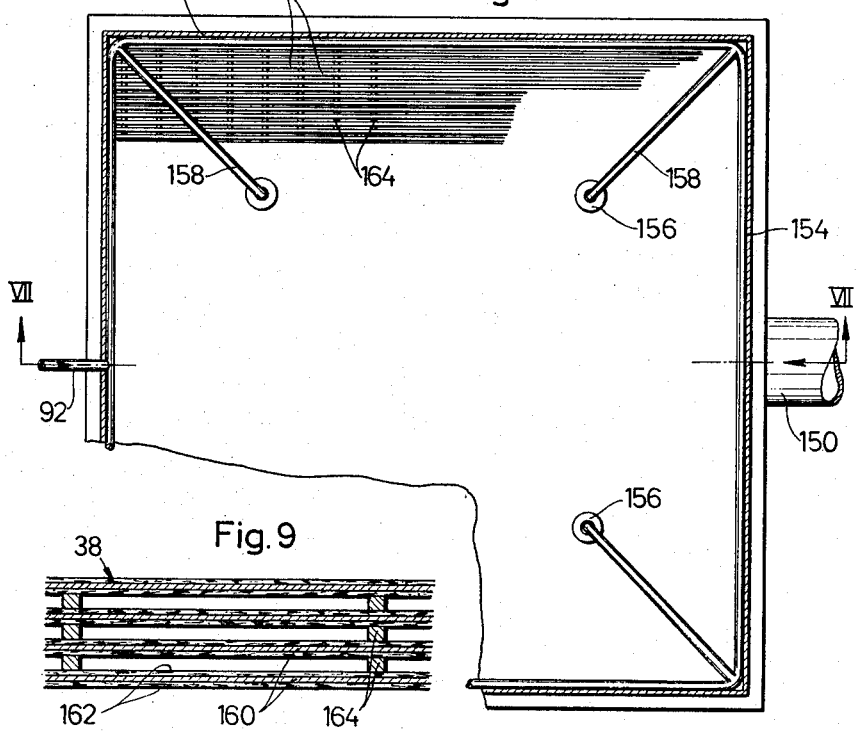
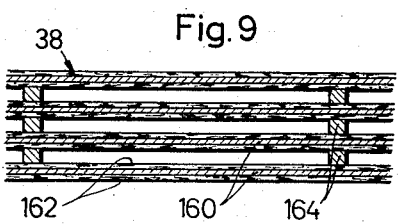

United States Patent Office 2,809,817
Patented Oct. 15, 1957

2,809,817

APPARATUS FOR EFFECTING PHYSICAL INTERACTION BETWEEN A GASEOUS AND A LIQUID MEDIUM

Carl Georg Munters, Stocksund, Sweden

Application July 12, 1954, Serial No. 442,688

Claims priority, application Sweden July 13, 1953

8 Claims. (Cl. 261—24)

The present invention relates to improvements in a gas and liquid contact apparatus. The interaction between the gas and the liquid is based on heat transfer and/or heat diffusion processes, the temperature and/or the content of a gaseous medium of a different gas or vapour being subjected to an alteration by performing the process. It imports for a liquid medium that the same may be actuated in a direction such as to subject to an alteration the temperature thereof and/or its concentration of a substance or component comprised therein. An important field of application of the invention is formed by apparatus for adjustment of the temperature and/or the percentage of moisture of the air to a desired value preferably by means of a liquid, which may be constituted by water, perhaps with addition of a moisture-absorbing substance, such as calcium chloride. As will be evident from the above, the invention comprises alterations of state based on transfer of heat, absorption, condensation, and evaporation, two or more of which may be used at the same time.

To obtain a high coefficient of heat transmission, when a gas passes through a clearance between two surfaces, a high velocity is imparted to the gas so as to make the gas current turbulent. However, this turbulence of whirling motion of the gas never reaches the actual surface, there being always next adjacent the latter a layer of the gas where the flow of the gas gradually changes from a turbulent to a laminary one, said layer being generally denominated as the boundary layer. This layer has an innermost portion, where the gas molecules are practically stationary and outside which the velocity of the gas increases successively. Inasmuch as the heat transfer in such a layer (the radiation being entirely disregarded here) largely is performed by conduction and thus causes considerably greater temperature gradients than in a purely turbulent flow, the limit layer is responsible for the main part of the resistance to the heat transfer between the gas and the surface. The coefficient of heat transmission between the gas and a stationary surface is therefore only a fraction of what it would be if there were no boundary. It will be possible to a certain extent, but never entirely, to eliminate the boundary layer by imparting a high velocity to the gas, but then the sacrificed energy of motion becomes unproportionately large, however, in comparison with the gain in an increased heat transfer due to the high velocity.

The present invention contemplates the passing of the gas through the clearances or interstices in a laminary flow. The width of the clearance is kept small, and in spite of the laminary flow high coefficients of heat transfer are obtained. The laminary flow makes operation possible with very moderate pressure drops which can be overcome by means of fans of ordinary type. Furthermore, by means of the close spacing of the foils or walls forming the interstices or passageways, a larger effective surface area per unit of volume than that of the apparatus heretofore used is obtained with a consequent increase in the coefficient of transmission.

The close spacing between the layers, however, creates a problem in that the liquid or individual drops thereof due to the surface tension tend to bridge the walls of the interstices or passageways between the layers, particularly at the liquid discharging ends thereof. This entrained liquid will close the passage for the gas and thus render effective exchange between these media impossible, or, at the most, in a very reduced degree. Therefore, an object of the invention is to prevent such bridging and provide a continuous drainage of the liquid from the interstices or passageways as fast as it runs down the walls or partitions thereof and thereby maintain the passageways open for the continuous flow of gas therethrough. Thus, the gas and liquid will flow in intimate contact with one another throughout the passageways. Despite this problem of bridging it has been found that such processes that are based on diffusion, that is to say absorption, condensation and evaporation, show surprisingly favourable coefficients of transmission when they are performed by means of laminarily constructed packs or bodies with narrow passages. In this case, the coefficient of transmission is understood to mean the quantity of medium which is transferred by diffusion per surface, time and pressure drop unit between a gas and the surface of a solid body or a liquid. Actually, an equivalence thus prevails according to certain laws between the coefficient of heat transmission and the coefficient of diffusion transfer, on which the coefficients of absorption, condensation and evaporation depend. According to this invention, these coefficients are comprised in the terms "the coefficient of transmission." Furthermore, "the change of state" is understood to be a change of the state of one of the media in any of the above named respects.

One object of the invention is to provide an apparatus of high efficiency on the basis of the observations above dsecribed. A further object of the invention is to provide an apparatus with increased surface area per unit of volume and a high co-effiecient of performance. A further object of the invention is to provide an apparatus of a simple construction and cheap in manufacture. These and other objects of the invention and properties otherwise characteristic thereof will hereinafter be described more detailed with reference to embodiments of the same illustrated by way of example in the accompanying drawings.

Fig. 7 shows a vertical section on line VII—VII of Fig. 8 through an embodiment, wherein, in difference from the preceding embodiments, the lamination body is stationary.

Fig. 8 shows a section on line VIII—VIII of Fig. 7, and Fig. 9 shows a portion of the lamination body in a section on line IX—IX of Fig. 7 and on a larger scale.

Similar parts in the various figures have been designated by the same reference numerals.

Figure 1:
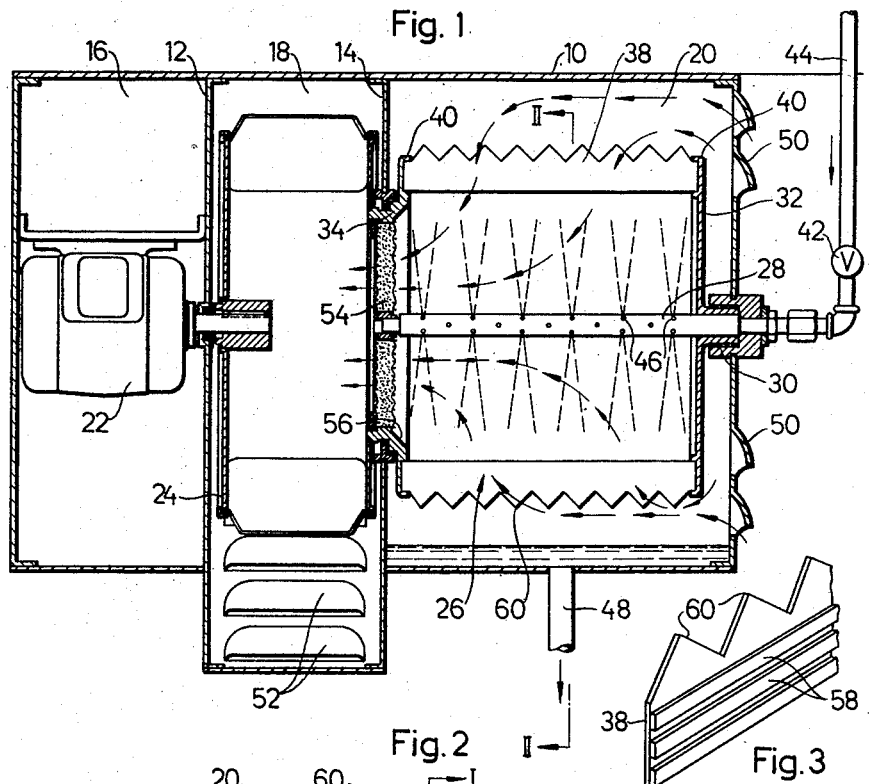
Fig. 1 shows a vertical longitudinal section on line I—I of Fig. 2 through an apparatus with a rotary lamination body constructed in accordance with the invention.
Figure 3:
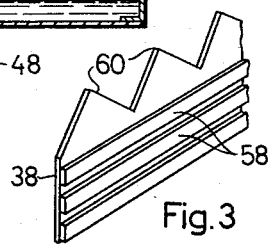
Fig. 3 shows a portion of a lamination body pertaining to this embodiment, the illustration being a perspective view on a larger scale.
Figure 2:
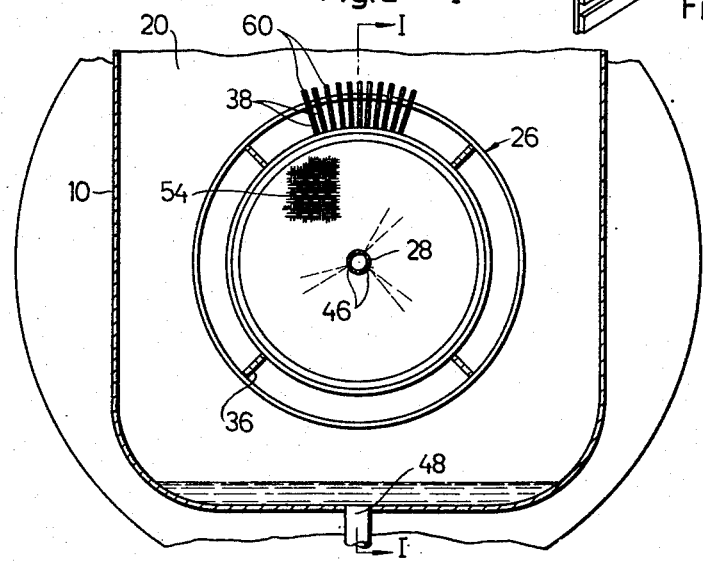
Fig. 2 shows a section on line II—II of Fig. 1.

In Figs. 1–3, 10 denotes the casing of the apparatus, which in this embodiment is divided by means of partitions 12, 14 into three chambers 16, 18 and 20. Located in the chamber 16 is a motor 22, and in the chamber 18 is arranged a fan 24 driven by said motor. The fan in turn drives a rotor located in the chamber 20 and generally designated by 26, the hollow shaft 28 of said rotor being mounted with the free end thereof in the casing at 30. The rotor 26 comprises two head plates 32, 34 that may be interconnected by means of axially extending braces 36, said head plates carrying at their outer peripheral portions lamination bodies or packs constructed in accordance with the invention. These packs, which fill the intermediate spaces between the braces 36, consist of layers or strips 38 of sheet or foils positioned radially and extending axially between the head plates 32, 34 which may be provided with folded edges 40 for the fixing of the position of the strips in the rotor.

The foils are preferably made of a poorly heat-conducting material, such as waterproof paper, glass fibre paper, plastic, asbestos, fabric or the like having a thickness of one or a few tenths of a millimeter.

It is assumed that the apparatus is intended for cooling of air. A liquid medium, such as cold water for example, is introduced through a conduit 44 provided with a control valve 42 to the hollow shaft 28 provided with a series of fine apertures 46, through which the water is sprayed out onto the lamination packs. By the centrifugal force the water is forced out through the clearances of the packs, and is then collected in the lower portion of the chamber 10 and escapes through a conduit 48. The relatively warm air enters through openings 50 in the head plate of the chamber 20 and is then permitted to pass through the clearances of the laminations 38 in a inward direction radially, that is to say, counter current to the path of flow of the water in the same. The air is cooled down in contact with the water and is conveyed by the fan 24 outward through openings 52 in the chamber 18. A filter 54 for the separation of water particles floating in the air may be provided in the path of the air so as to the utmost possible extent to prevent said water particles from pentrating into the fan wheel. The filter 54 is located in the head plate 34 and rotates with the latter. Water caught by the filter is hurled outwardly by the centrifugal force, and is conveyed back to the chamber 20 along a preferably bevelled wall surface 56.

In the interstices between the foils exchange of heat takes place between the warm air and the cold water, as the two media flow through the packing. One might expect that the resistance to flow in the narrow clearance would become too great, since the velocity will at the same time have to be of such magnitude as to obtain the desired capacity. However, due to the high coefficient of heat transmission and the close spacing of the foils, the latter may be realtively short in the direction of flow of the gas. On the other hand, the resistance to flow may become smaller than 10 mm. water column at an air velocity of 1.5 m./sec., which can be obtained with a fan of simple construction. At the same time, the fan 24 should be dimensioned so as to overcome the pump effect caused by the inwardly directed flow of the air between the layers 38.

The layers 38 are preferably of a type such as to be wetted by the liquid or adapted to absorb the same, in the present case the water, so as to cause the liquid to spread in the form of a thin film over the surfaces of the layers. The layers may be provided with thin strips 58 of a material, such as metal, with a high coefficient of heat transmission, and their object is to spread the heat in an axial direction. The narrow strips are, however, insulated from one another in a radial direction by the poorly heat-conducting foils 38.

By the fact that the distance between the laminations 38 is small, the capillary force tending to retain the liquid at the outer periphery of the rotor is correspondingly great. For this reason the laminations are shaped so as to prevent drops of liquid from closing the discharge openings of the passageways. In the embodiment shown, the external face of the laminations presents a kind of saw-tooth shape and forms serrations or projections 60. The liquid, which in spite of the centrifugal force is entrained in the outer portions of the clearances is concentrated to the points, but always leaves the valleys between the serrations free, so as to provide here open passages for the gas. The radial extension of the projections is selected so great that the liquid drops are incapable of remaining in places of the clearances other than the points of the projections.

Figure 4:
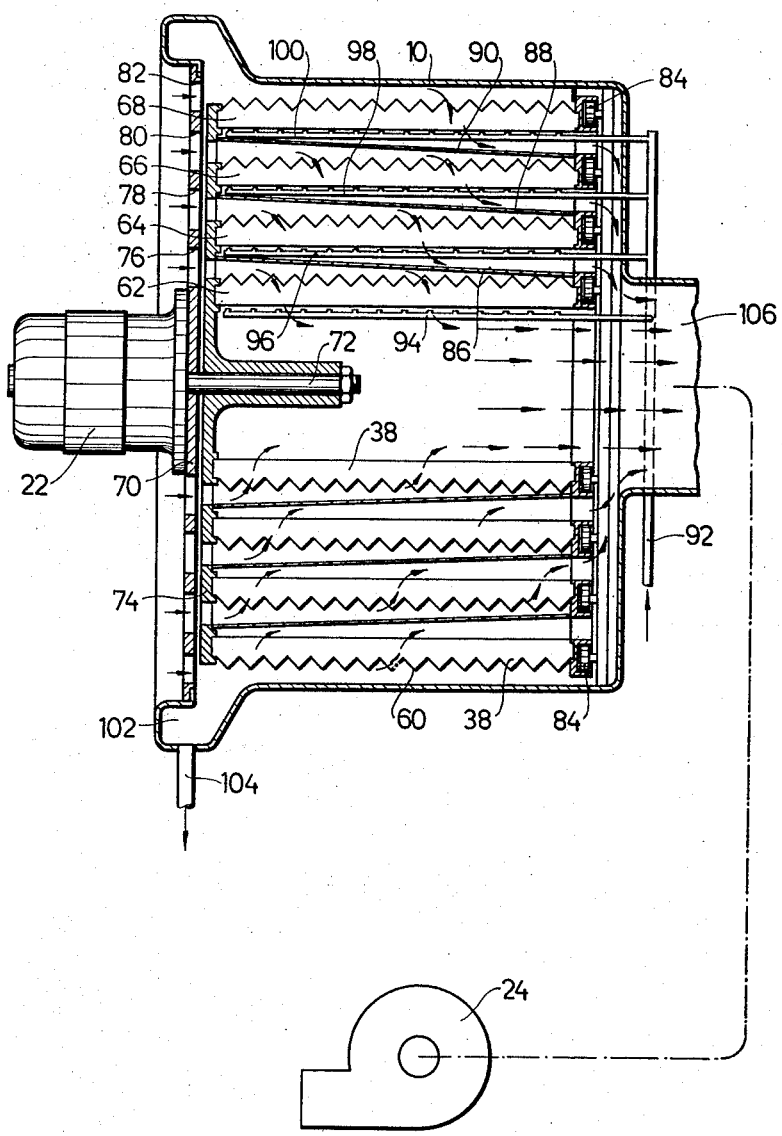
Fig. 4 shows a vertical longitudinal section through an apparatus according to a further embodiment of the invention.

The embodiment according to Fig. 4 differs from the preceding one substantially only by being provided with a number of concentrically arranged rotors, such rotors being four in number in the embodiment shown, namely 62, 64, 66 and 68, each of which comprises lamination bodies or lamination packs constructed in accordance with the invention. The motor 22, which is secured in the heat plate 70 of the casing 10, has a journal 72 carrying a disc 74 onto which the individual rotors are secured. Provided in the head plate 70 are openings 76, 78, 80 and 82 of different radii, through which the gaseous medium, such as air, is supplied to the external side of the respective rotors. The rotors may be mounted with their other ends on rollers 84. The gas paths through the various rotors are separated from one another by partitions 86, 88 and 90, the diameters of which preferably diminish from the inlet side toward the outlet side so as to increase the area of flow for the gas current of the externally located rotor and to decrease the area of flow for the gas current of the internally located rotor in the direction toward the outlet. Extending from a common supply conduit 92 for the liquid, such as cold water, are branch conduits 94, 96, 98 and 100 to the inner face of the respective packs of laminations. Every branch conduit has fine outlet openings spraying the liquid outwardly toward the lamination packs. The liquid escapes to a collecting channel 102 in the casing 10 and through a conduit 104. The various gas currents unite into a common outlet 106.

If the air is not saturated by water vapour, then an evaporation may occur simultaneously with the heat transfer, such evaporation involving that the air can be further cooled. If the air reaches the dew-point during its passage through the apparatus, water vapour may instead condense in the lamination packs during the latter part of the cooling procedure. Inversely, the heat exchanger may be utilized for the cooling of a liquid, such as water, in a cooling tower. Decisive is here the removal of heat by means of evaporation of the water. In the narrow clearances the path of diffusion of the vapour becomes short, the coefficient of transmission thus becoming correspondingly very high. The cooled water may then be used for the cooling of a condenser, for example, and may then be returned to the apparatus through the conduit 44.

The statements hereinabove also hold true if the gas contains vapour of some other liquid, such as trichlor-ethylene, which is used in chemical laundry plants or as a solvent in spray painting.

The liquid may have an absorbing influence on a medium or vapour entrained with the gas. Relevant example are the drying of air from water vapour, for instance by means of calcium or lithium chloride in an aqueous solution which might be a cold one, or from trichlor-ethylene by means of an oil absorbing the same. The liquid may then be caused to circulate in a closed circuit containing a regenerator, wherein the absorbed medium is separated, in order then to return to the apparatus on having, perhaps, been cooled down.

Figure 5:
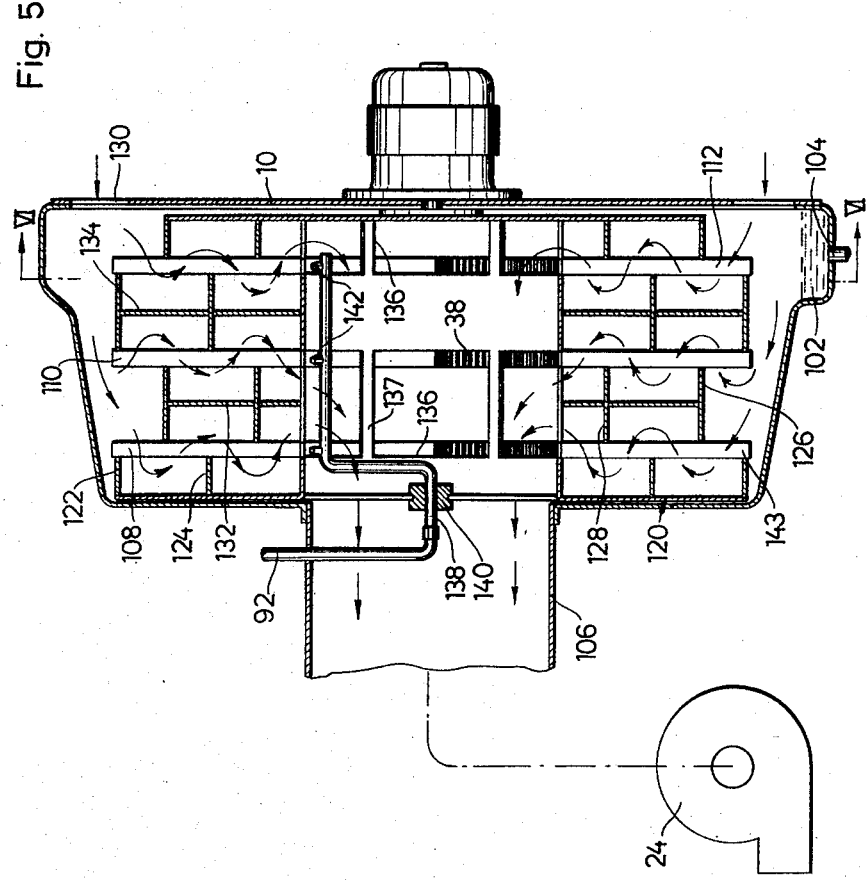
Fig. 5 shows a vertical longitudinal section through a further embodiment of the invention.
Figure 6:
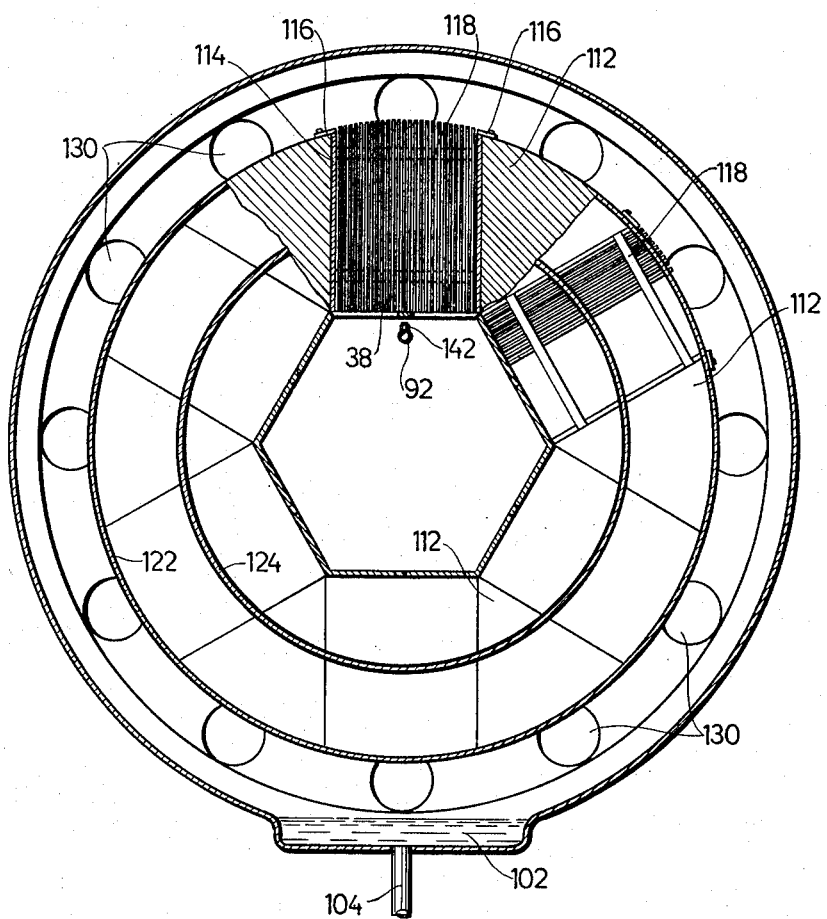
Fig. 6 shows a section on line VI—VI of Fig. 5.

In the embodiment according to Figs. 5 and 6, the two media pass one another in cross currents instead of pure countercurrents as in the preceding embodiment. Inserted into each of three rotors 108, 110 and 112 are a number of packs, in the present case six packs 38, which are each per se constructed, in accordance with the invention, of spaced thin layers as disclosed above. Each pack may be encased in a kind of cassette 114, the shape of which fits a recess in the rotor, to which said cassette is secured by pivotally mounted pawls 116. The spaced position of the foils relative one another is secured by means of distance pieces that may be constituted by strips 118 glued to the lateral surfaces of the pack.

The rotor is carried in turn by a cage, generally designated by 120, said cage having cylindrical walls 122, 124, 126 and 128 arranged in different spaced relation to the center of rotation so as to provide a zigzag shaped path of flow through the substantially radially disposed foils 38 to the gas, such as air, entering through openings 130 in the casing 10. By means radial partitions 132, 134 the air current is divided into three part currents of a similar zigzag shape corresponding to the number of rotors. The cage 120 is provided with openings 136 on the inner side thereof, said openings being separated from one another by stays 137 and affording free escape of the gas to the central outlet passages 106 communicating with the fan 24.

The liquid medium, such as water, enters through the conduit 92, which may have a portion 138 extending axially along the center of the apparatus and serving as a shaft for a rotor hub 140. Immediately inside the rotors 108, 110 and 112, the conduit 92 is provided with outlet nozzles 142 through which the liquid is sprayed radially outwards through the clearances of the lamination packs.

While the liquid medium thus flows radially outwards, the gaseous medium passes the clearances of the packs a plurality of times, in the present case four times, in a substantially axial flow at a successively diminishing radius. The axial extension of the lamination packs is smaller than according to the above disclosure, the combined path of the gas flow thus becoming 60–100 mm. for example. Where cooling by means of water for example, is in consideration, the air current introduced through the openings 130 will, each time it passes the clearances of the laminations, meet water of a lower temperature. The layers 38 extend for a distance outside the cage wall 122, as indicated at 143, which distance may be equal to the radial length over which the liquid can keep in the clearances due to the capillary force.

The embodiment according to Figs. 7 and 8 has a casing 10 horizontally divided at 144. A pack of layers 38 is inserted for example between an upper flange 146 in the casing and a plate 148 disposed at the dividing joint. The gaseous medium enters to reach the lower side of the pack through a conduit 150 and escapes, on having passed the clearances of the layers, through a conduit 152 on the upper side of the casing. The liquid medium is supplied through a conduit 154 which may extend round the borders of the casing and which is provided with branch conduits 158 terminating in a spray head or douche. The spraying heads or douches spread the liquid over the whole horizontal area of the pack.

As illustrated on a greatly enlarged scale in Fig. 9, the layers of the pack of laminations consist of a foil 160 of paper, plastic or the like, which is covered on one or both sides thereof with fibres or a fine-meshed net or fabric 162 consisting, for example, of glass fibres. The middle element 160 may also be a net, for instance one of metal, carrying fine-meshed layers 162 on one or both sides thereof. Otherwise, the layers 162 may be made of any other fibrous or porous material adapted to be wetted or having liquid-spreading properties. Otherwise, the layers 162 should be of a nature such as to produce therein or thereon a film of the liquid uninterrupted and as homogeneous as possible. Serving as distance pieces are fillets 164 having a thickness corresponding to the desired clearance distance. These constructions may also be made use of in the preceding embodiments.

The downwardly facing side of the layers 38 is formed into projections 60, preferably of a downwardly tapering shape to avoid closing of the clearances by entrained liquid due to the influence of the capillary force. The liquid entrained at the points of the projections cannot rise so high as to close the valleys formed by the projections. In this case, when the pack of laminations is stationary, it is of special importance that the layers or foils are shaped in some way or other on the outlet side of the liquid, in a manner such that drops remaining through the capillary force will not close the clearances existing there. This may be accomplished by extending the inclined surfaces of the projection beyond the capillary rise of the liquid in the passageways. By capillary rise is meant the height to which the liquid rises by capillary attraction in the passageways.

Obviously, the invention is not limited to the embodiment shown, but may be varied in its widest aspects within the scope of the basic idea thereof. The layers may consist of foils of poorly heat-conducting metal of a thickness of 0.05 mm., for example. In certain cases, where the heat quantities released by absorption are large, it may be found advantageous to cause the gas and the liquid to meet in a plurality of series-connected exchanger bodies, intermediate cooling of the liquid being then provided in the path of the liquid from one exchanger body to the next one. This also holds true in evaporation processes.

What I claim is:

1. In a gas and liquid contact apparatus, a packing unit means for passing a gas and a liquid through said unit in intimate contact with one another, said packing unit comprising a series of thin partition walls arranged to divide the packing into a plurality of adjacent passageways open at both ends to allow the liquid to flow along each side of the common partition walls between the passageways to the liquid discharging ends thereof in contact with the gas flowing through the interstices between said walls, said passageways being so narrow that the liquid can bridge the walls at the liquid discharging end of the passageways by capillary cohesion, and means for breaking the cohesion to drain the liquid from the passageways as it flows along the walls thereof towards the liquid discharging ends of the passageways and thereby provide openings for the flow of gas through the passageways.

2. A gas and liquid contact apparatus in accordance with claim 1 in which the means for breaking the cohesion comprises structure at the liquid discharging ends of the walls to break the liquid seal and thereby open the passages for the free flow of gas thereto.

3. In a gas and liquid contact apparatus, a packing unit means for passing a gas and a liquid through said unit in intimate contact with one another, said packing unit comprising a series of thin partition walls arranged to divide the packing into a plurality of adjacent passageways open at both ends to allow the liquid to flow along each side of the common partition walls between the passageways to the liquid discharging ends thereof in contact with the gas flowing through the interstices between said walls, said passageways being so narrow that the liquid can bridge the walls at the liquid discharging ends of the passageways by capillary cohesion; said partition walls being serrated along the edges of their liquid discharge ends to form inclined projections providing free openings for the gas between the partition walls at said ends.

4. A gas and liquid apparatus according to claim 3 in which the inclined projections on adjacent partition walls extend in parallel arrangement transversely across said packing unit.

5. A gas and liquid contact apparatus according to claim 3 in which the inclined projections extend beyond the capillary rise of the liquid in said passageways.

6. A packing unit for a gas and liquid contact apparatus comprising a series of thin partition walls arranged to divide the packing into a plurality of adjacent passageways, said passageways being so narrow that a liquid having substantially a surface tension characteristic of water can bridge the walls thereof by capillary cohesion whereby to provide a large surface area per unit of volume of packing and means at one side of the packing for breaking the cohesion to drain the liquid continuously from the passageways and to maintain the passageways open.

7. A packing unit for a gas and liquid contact apparatus in accordance with claim 6 in which the structure for breaking the cohesion comprises serrations at one side of the packing forming inclined projections.

8. A packing unit for a gas and liquid contact apparatus in accordance with claim 7 in which the inclined projections extend beyond the capillary rise of the liquid in the passageways.

References Cited in the file of this patent

UNITED STATES PATENTS

| | | |
|---|---|---|
| 1,051,017 | Schmidt | Jan. 21, 1913 |
| 1,292,125 | Stevens | Jan. 21, 1919 |
| 1,650,140 | Kuhni | Nov. 22, 1927 |
| 2,317,951 | Burk | Apr. 27, 1943 |
| 2,394,293 | Deem | Feb. 5, 1946 |
| 2,612,359 | Simpson | Sept. 30, 1952 |
| 2,615,835 | Dixon | Oct. 28, 1952 |
| 2,665,123 | Foster et al. | Jan. 5, 1954 |

OTHER REFERENCES

Servel, Inc. Bulletin OAC-88-08, copyrighted 1950.